United States Patent
Kang et al.

(10) Patent No.: US 8,396,344 B2
(45) Date of Patent: Mar. 12, 2013

(54) METHOD OF REPRODUCING FROM STORAGE MEDIUM STORING INTERACTIVE GRAPHICS STREAM ACTIVATED IN RESPONSE TO USER'S COMMAND

(75) Inventors: Man-seok Kang, Suwon-si (KR);
Kil-soo Jung, Hwaseong-gun (KR);
Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2049 days.

(21) Appl. No.: 11/442,536

(22) Filed: May 30, 2006

(65) Prior Publication Data

US 2006/0216000 A1     Sep. 28, 2006

Related U.S. Application Data

(63) Continuation of application No. 10/954,357, filed on Oct. 1, 2004, now Pat. No. 8,175,444.

(30) Foreign Application Priority Data

Jan. 14, 2004    (KR) .................................. 2004-2716
Mar. 31, 2004    (KR) ................................ 2004-22042

(51) Int. Cl.
*H04N 5/262*      (2006.01)
(52) U.S. Cl. ....................................................... 386/239
(58) Field of Classification Search ................... 386/46, 386/52, 95, 124–126, 239, 243, 296, 297, 386/356; 348/73, 468; 715/719–722
See application file for complete search history.

(56) References Cited

U.S. PATENT DOCUMENTS

| | | | |
|---|---|---|---|
| 5,119,465 A * | 6/1992 | Jack et al. ...................... 717/137 |
| 5,671,009 A | 9/1997 | Chun | |
| 5,929,857 A | 7/1999 | Dinallo et al. | |
| 6,219,043 B1 | 4/2001 | Yogeshwar et al. | |
| 6,246,402 B1 | 6/2001 | Setogawa et al. | |
| 6,272,627 B1 | 8/2001 | Mann | |
| 6,348,951 B1 | 2/2002 | Kim | |
| 6,392,695 B1 | 5/2002 | Watamoto et al. | |
| 6,678,008 B1 | 1/2004 | Winter | |
| 6,718,119 B1 | 4/2004 | Fujinami | |
| 7,363,645 B1 | 4/2008 | Hendricks | |
| 2001/0007455 A1 | 7/2001 | Yoo et al. | |
| 2002/0186320 A1 * | 12/2002 | Carlsgaard et al. ........... 348/468 |

(Continued)

FOREIGN PATENT DOCUMENTS

CN         1745579         3/2006
EP          1 377 030        1/2004

(Continued)

OTHER PUBLICATIONS

Search Report and Written Opinion issued by Intellectual Property Office of Singapore in Singapore Patent Application No. 200601853-5 on Feb. 4, 2008.

(Continued)

*Primary Examiner* — Thai Tran
*Assistant Examiner* — Mishawn Dunn
(74) *Attorney, Agent, or Firm* — NSIP Law

(57) ABSTRACT

A method of reproducing from a storage medium video data and graphics data for displaying a menu screen. The method includes: decoding graphics data; and outputting, on the basis of the decoded graphics data, the decoded graphics data when an activation command is generated by a user or displaying the decoded graphics data at a designated time.

2 Claims, 17 Drawing Sheets

U.S. PATENT DOCUMENTS

| | | | |
|---|---|---|---|
| 2003/0025836 | A1 | 2/2003 | An et al. |
| 2003/0038895 | A1* | 2/2003 | Yang et al. .................... 348/569 |
| 2003/0053382 | A1 | 3/2003 | Tsujimoto |
| 2004/0001703 | A1 | 1/2004 | Kang |
| 2004/0042763 | A1* | 3/2004 | Morita et al. ................... 386/46 |
| 2006/0045481 | A1 | 3/2006 | Yahata et al. |
| 2006/0164938 | A1 | 7/2006 | Kuno |
| 2006/0188223 | A1 | 8/2006 | Ikeda et al. |
| 2006/0288302 | A1 | 12/2006 | Yahata et al. |
| 2006/0291810 | A1* | 12/2006 | McCrossan et al. ............ 386/95 |

FOREIGN PATENT DOCUMENTS

| | | |
|---|---|---|
| EP | 1 377 050 | 1/2004 |
| EP | 1 608 165 | 12/2005 |
| GB | 2379060 | 4/2003 |
| JP | 10-028273 | 1/1998 |
| JP | 11-112931 | 4/1999 |
| JP | 2001-525635 | 12/2001 |
| JP | 2002-238032 | 8/2002 |
| JP | 2003-346425 | 12/2003 |
| SG | 123881 | 7/2005 |
| SG | 113536 | 8/2005 |
| WO | WO 00/36600 | 6/2000 |
| WO | WO 01/26053 | 4/2001 |
| WO | WO 2004/068854 | 8/2004 |

OTHER PUBLICATIONS

Danish PTO Search Report issued in Singapore Patent Application No. SG 2004-07783-0 on Oct. 8, 2005.
Office Action issued in Korean Patent Application No. 2004-22042 on Jan. 27, 2006.
U.S. Appl. No. 10/954,363, filed Oct. 1, 2004, Man-seok Kang, et al., Samsung Electronics Co., Ltd.
European Search Report issued Apr. 17, 2008 by the European Patent Office re: European Patent Application No. 05250070.9 (3 pp).
Office Action issued by Chinese Patent Office in Chinese Patent Application No. 20050002079.2 on Apr. 20, 2007.
Australian Written Opinion and Search Report mailed Apr. 2, 2008 by the Intellectual Property Office of Singapore re: Singapore Patent Application No. 200601861-8 (9 pp).
Office Action issued on May 2, 2007 by the Russian Patent Office for Russian Patent Application No. 2006119144.
Search report issued in Singapore Patent Application No. 200601859-2 on May 29, 2008.
Office Action issued in Chinese Patent Application No. 200610094315.2 on Jun. 20, 2008.
Office Action issued in Taiwanese Patent Application No. 95124609 on May 25, 2009.
U.S. Appl. No. 10/954,357, filed Oct. 1, 2004, Man-seok Kang et al., Samsung Electronics Co., Ltd.
U.S. Appl. No. 10/954,363, filed Oct. 1, 2004, Man-seok Kang et al., Samsung Electronics Co., Ltd.
U.S. Appl. No. 11/430,969, filed May 10, 2006, Man-seok Kang et al., Samsung Electronics Co., Ltd.
U.S. Appl. No. 11/430,973, filed May 10, 2006, Man-seok Kang et al., Samsung Electronics Co., Ltd.
U.S. Appl. No. 11/442,532, filed May 30, 2006, Man-seok Kang et al., Samsung Electronics Co., Ltd.
Taiwanese Office Action issued on Apr. 23, 2010, in corresponding Taiwanese Application No. 095124602 (4 pages).
Japanese Office Action issued on Jun. 8, 2010, in corresponding Japanese Application No. 2005-005705 (3 pages).
Examination Report mailed on Jun. 5, 2012 in counterpart European Patent Application No. 05250070.9 (3 pages, in English).

* cited by examiner

FIG. 6A

```
graphics_segment ( ) {
        segment_descriptor ( ) —602
        segment_data
}
```

FIG. 6B

```
segment_descriptor ( ) {
        segment_type ( ) —604
        segment_length
}
```

FIG. 6C

| value | segment_type |
|---|---|
| 0x00 – 0x13 | reserved |
| 0x14 | Palette Definition Segment |
| 0x15 | Object Definition Segment |
| 0x16 | Presentation Composition Segment |
| 0x17 | Window Definition Segment |
| 0x18 | Normal_ICS — 606 |
| 0x19 | On_demand_ICS — 607 |
| 0x1A – 0x7F | reserved |
| 0x80 | End of Display Set Segment |
| 0x81 – 0xFF | reserved |

```
interactive_composition_segment ( ) {
    segment_type
    segment_length
    ICS_type  —702
    . . .
}
```

FIG. 13
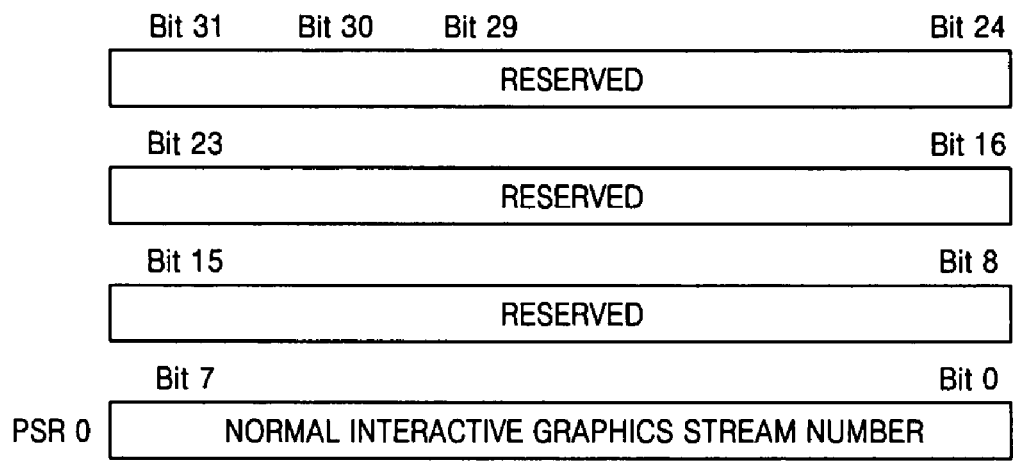
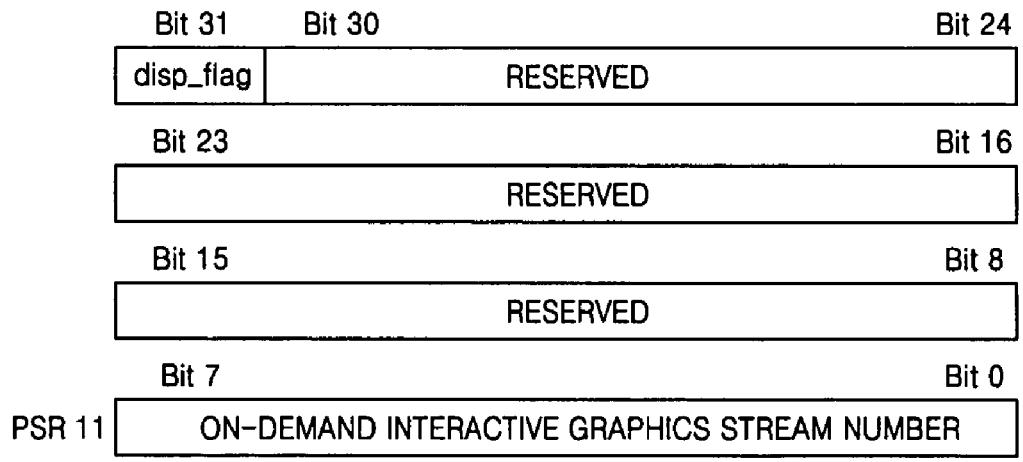

FIG. 14

```
Activate_On_demand ( ) {
    if (On-demand ICS ready) {
        On-demand ICS display
        set focus
    }
    else {
        do nothing
            or
        display message - "Not available On-demand ICS"
    }
}
```

METHOD OF REPRODUCING FROM STORAGE MEDIUM STORING INTERACTIVE GRAPHICS STREAM ACTIVATED IN RESPONSE TO USER'S COMMAND

CROSS-REFERENCE TO RELATED APPLICATIONS

This application is a continuation application of U.S. patent application Ser. No. 10/954,357, filed on Oct. 1, 2004, now U.S. Pat. No. 8,175,444, which claims the priority of Korean Patent Application Nos. 2004-2716 and 2004-22042, respectively filed on Jan. 14, 2004 and Mar. 31, 2004, in the Korean Intellectual Property Office, the disclosures of which are incorporated herein by reference.

BACKGROUND OF THE INVENTION

1. Field of the Invention

The present invention relates to reproduction of a multimedia image, and more particularly, to method of reproducing from a storage medium storing an interactive graphics stream displayed in response to a user's command.

2. Description of Related Art

To reproduce a multimedia image, audio-visual (AV) data of the multimedia image, navigation data controlling reproduction of the AV data, and system data including command information related to a title of AV data to be initially reproduced when the storage medium is inserted in a reproducing apparatus are recorded in a storage medium. Other data can also be recorded in the storage medium. In particular, the AV data is recorded in the storage medium by multiplexing video, audio, subtitles, and a menu as a main stream.

FIG. 1 is a block diagram of general AV data recorded in a storage medium.

Referring to FIG. 1, in a storage medium storing a multimedia image, a video stream 102, an audio stream 104, a presentation graphic stream 106 for providing a subtitle, and an interactive graphics stream 108 for providing a menu screen are multiplexed (MUX) and recorded as a main stream. Hereinafter, the multiplexed main stream is called AV data 110.

FIG. 2 is a block diagram of a general reproducing apparatus for reproducing AV data from a storage medium 200 in which the AV data 110 is recorded.

Referring to FIG. 2, a reproducing apparatus for reproducing a multimedia image reads navigation data, as described above, and obtains control information required for reproducing the AV data 110. For example, the control information includes a coding type of the AV data 110, a bit rate, information indicating an area in which the AV data 110 is recorded, and the type of data included in the AV data 110. By referring to the control information, a reading unit 210, a demultiplexer 220, video, presentation, interactive graphics, and audio decoders 230, 240, 250, and 260, respectively, are controlled.

In detail, with concurrent reference to FIGS. 1 and 2, the reading unit 210 reads multiplexed AV data 110 from a storage medium 200 using the information indicating the area in which the AV data 110 is recorded and transmits the multiplexed AV data 110 to the demultiplexer 220. The demultiplexer 220 divides the received AV data 110 into the video stream 102, the audio stream 104, the presentation graphic stream 106, and the interactive graphics stream 108 and transmits the divided streams 102 through 108 to the decoders 230 through 260, respectively. Each stream transmitted to the respective decoder is decoded according to a corresponding data type and ready to be displayed on a screen at a designated time. The decoded video stream 102, the presentation graphic stream 106, and/or the interactive graphics stream 108 are overlaid as a single image using a blender 270. Finally, an image selected based on an output status set by a user is displayed on the screen. For example, an output status can be controlled based on a user's selection such as of a subtitle on/off status and a mute status, etc.

In particular, the interactive graphics decoder 250 receives the interactive graphics stream 108 from the storage medium 200, decodes the interactive graphics stream 108, and outputs a menu screen including buttons on the screen at a designated time. A user's selection can be input by the user selecting a specific button on the output menu screen. That is, a user interactive function can be provided.

However, a conventional reproducing apparatus unconditionally outputs a menu screen at a designated time even if a user does not want to watch the menu when reproducing multimedia such as a movie. If an undesired menu screen is displayed when viewing a movie, a user may be inconvenienced.

BRIEF SUMMARY

According to an aspect of the present invention, there is provided a reproducing method of reproducing a storage medium storing video data and graphics data for displaying a menu screen. The method includes decoding graphics data, and on the basis of the decoded graphics data, outputting the decoded graphics data when an activation command is generated by the user or outputting the decoded graphics data at a designated time.

According to another aspect of the present invention, there is provided a method of reproducing an interactive graphics stream from a storage medium, including: reading an interactive graphics stream from the storage medium; decoding the read interactive graphics stream; determining a type of the read interactive graphics stream, and blending the decoded interactive graphics stream with video data and one of displaying the blended data at a designated time when the decoded interactive graphics stream is a normal interactive graphics stream and displaying the blended data when an activation command is received when the decoded interactive graphics stream is an on-demand interactive graphics stream.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6a through 6c illustrate a method of discriminating an on-demand interactive graphics stream according to an embodiment of the present invention from a normal interactive graphics stream;

FIG. 13 illustrates a configuration of a player status register recording information regarding an interactive graphics stream according to another embodiment of the present invention;

FIG. 14 illustrates a process of handling a command for activating an on-demand interactive graphics stream generated by a user;

DETAILED DESCRIPTION OF EMBODIMENTS

Figure 1:
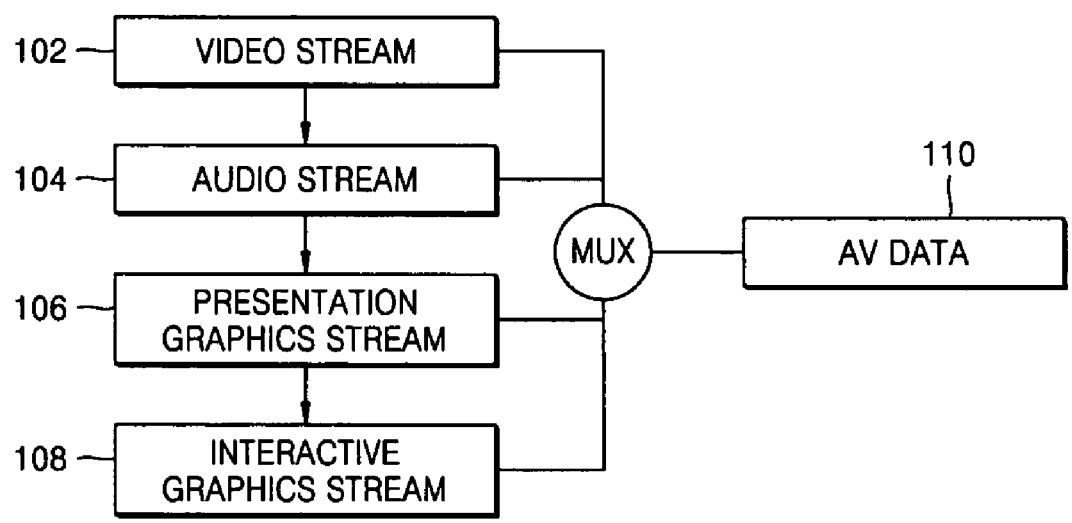
FIG. 1 is a view of conventional AV data recorded in a storage medium.
Figure 2:
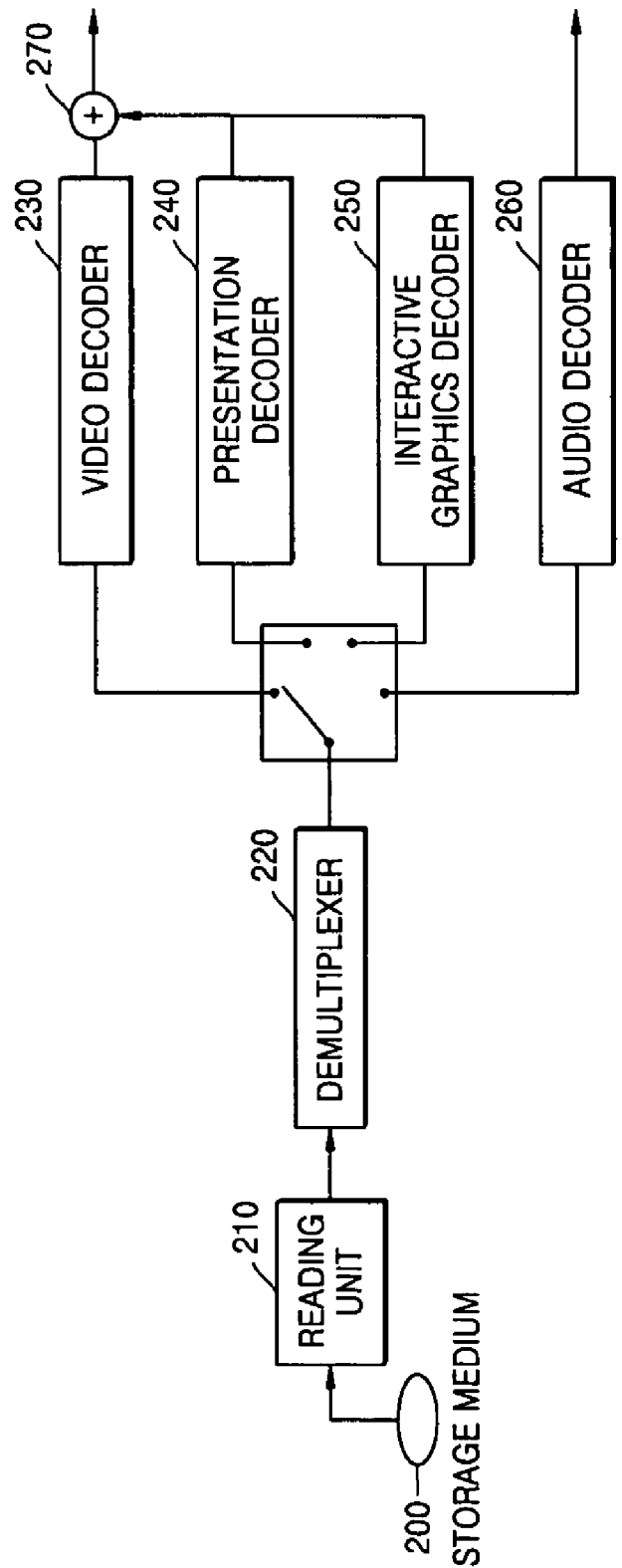
FIG. 2 is a view of a conventional reproducing apparatus for reproducing a storage medium in which AV data is recorded.

Reference will now be made in detail to the embodiments of the present invention, examples of which are illustrated in the accompanying drawings, wherein like reference numerals refer to the like elements throughout. The embodiments are described below to explain the present invention by referring to the figures.

As used in the present Specification, a normal interactive graphics stream refers to a data stream which provides a menu screen at a designated time. Also, as used in the present Specification, an on-demand interactive graphics stream refers to a data stream which provides a menus screen which is displayed only when a user desires.

Figure 3:
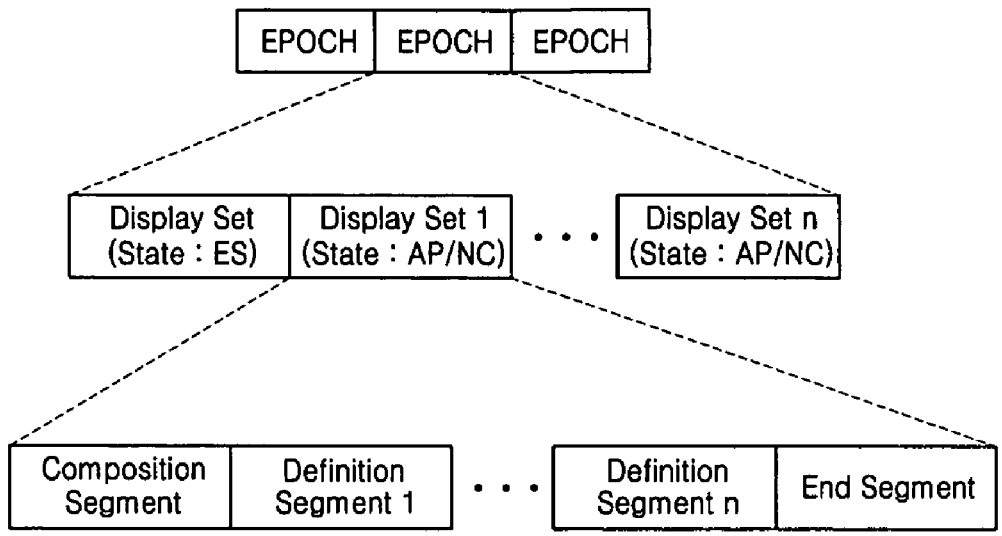
FIG. 3 illustrates a configuration of an interactive graphics stream according to an embodiment of the present invention.

FIG. 3 illustrates a configuration of an interactive graphics stream according to an embodiment of the present invention.

Referring to FIG. 3, an interactive graphics stream is divided into units of epochs according to how a decoder operates. Information for reproducing a button on a menu screen including a plurality of buttons is called an interactive graphics object. All interactive graphics objects included in an epoch are decoded and stored in an object buffer of an interactive graphics decoder, to be described later, and unless data of a subsequent epoch is input, the stored objects are maintained. Accordingly, in one epoch, the interactive graphics object does not have to be decoded every time it is used, and the already decoded and stored interactive graphics objects can be reused. However, when a subsequent epoch starts after one epoch is finished, all buffers of the decoder are reset, and all stored data disappears. Also, the amount of time after which a buffer of the decoder is reset is defined as a specified time.

Display sets are defined as output units of the interactive graphics objects, as shown in FIG. 3. A display set indicates a set of interactive graphics objects displayed on a single screen, and one epoch can include at least one display set. There are three types of display sets. The first is an epoch start (ES) display set indicating the start of an epoch, and includes all data for outputting an interactive graphics such as interactive graphics configuration information required for configuring the interactive graphics and object data used for a button image. The second is an acquisition point (AP) display set that can exist after the ES display set and includes all information for configuring an interactive graphic to prepare for a situation such as a user's random search. The third is a normal state (NC) display set including data that must be changed among interactive graphics in a previous display set, i.e., only data to be updated. As shown in FIG. 3, one epoch can include a plurality of display sets. The ES display set exists at an initial part of an epoch, and AP and NC display sets are located at subsequent positions. An ES display set is necessary for each epoch, but the AP and NC display sets are optional.

Each display set includes a composition segment storing configuration information of an interactive graphics stream, a plurality of definition segments, each recording object data such as a real image of a button displayed on a screen, and an end segment indicating the end of the display set. The composition segment includes output finish time information, button configuration information, and operation information indicating how a reproducing apparatus responds to a user operation. The composition segment can be realized with an interactive composition segment (ICS) data structure. The definition segment includes an object definition segment (ODS) including object data having image information of a button and a palette definition segment (PDS) including color information adapted to the ODS.

Each segment in a single display set is recorded in a packetized elementary stream (PES), which is a packet unit of an MPEG-2 transport stream (TS). A relevant display set is decoded at a decoding time indicated by a decoding time stamp (DTS) included in the PES, and is displayed on a screen at a presentation time indicated by a presentation time stamp (PTS). Also, an output finish time when the output of the relevant display set is complete is determined by a composition_time_out_pts field value recorded in the ICS indicating a data structure of the composition segment.

Accordingly, the interactive graphics stream is displayed on the screen at a designated time indicated by the PTS, a user command is received, an operation is performed in response there to, and the interactive graphics stream disappears from the screen at a designated output finish time indicated by composition_time_out_pts. However, if the interactive graphics stream is output using only a designated time, a menu screen is unconditionally output at the designated time even if the user does not want it to. That is, the menu screen can be activated at a time other than when the user wants it to, not just when a user wants it to.

Therefore, according to an embodiment of the present invention, an on-demand interactive graphics stream activated by a user's command is defined by expanding a function of the interactive graphics stream to perform a user interactive operation. To discriminate from the on-demand interactive graphics stream defined in the present invention, the interactive graphics stream output at a designated time is called a normal interactive graphics stream.

The normal interactive graphics stream is displayed on a screen at a designated time and disappears at a later designated time. On the other hand, the on-demand interactive graphics stream is displayed on a screen only when an activation command is generated by a user after all data is decoded and ready to be output, and performs a designated operation in response to an input from the user. That is, as in the normal interactive graphics stream, in the on-demand interactive graphics stream, interactive graphics objects such as buttons can first be displayed at a time designated by the PTS. However, in the on-demand interactive graphics stream, the buttons are not displayed on the screen, unless the user inputs a command to do so.

In the normal interactive graphics stream, the composition_time_out_pts indicates a time when the buttons are no longer displayed on the screen. However, in the on-demand interactive graphics stream, the composition_time_out_pts indicates a time when data related to the buttons is deleted from the buffer of the decoder. That is, even if a button activation command is generated by the user after the output finish time, since the on-demand interactive graphics stream to be activated does not exist any longer, the activation command from the user is ignored.

Figure 4:
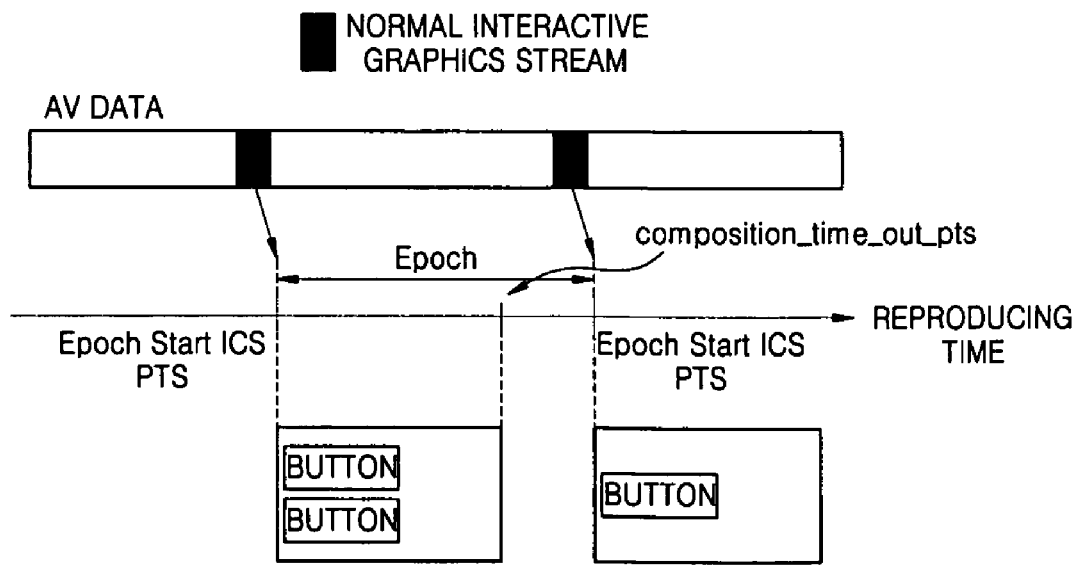
FIG. 4 illustrates an operation when a normal interactive graphics stream is reproduced.
Figure 5A:
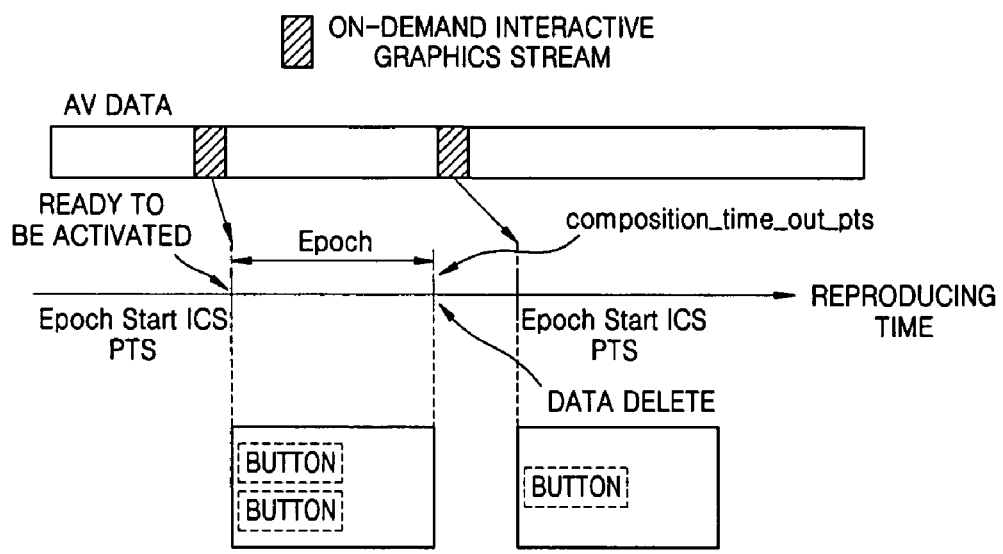
FIGS. 5A and 5B illustrate operations when an on-demand interactive graphics stream is reproduced according to an embodiment of the present invention.
Figure 5B:
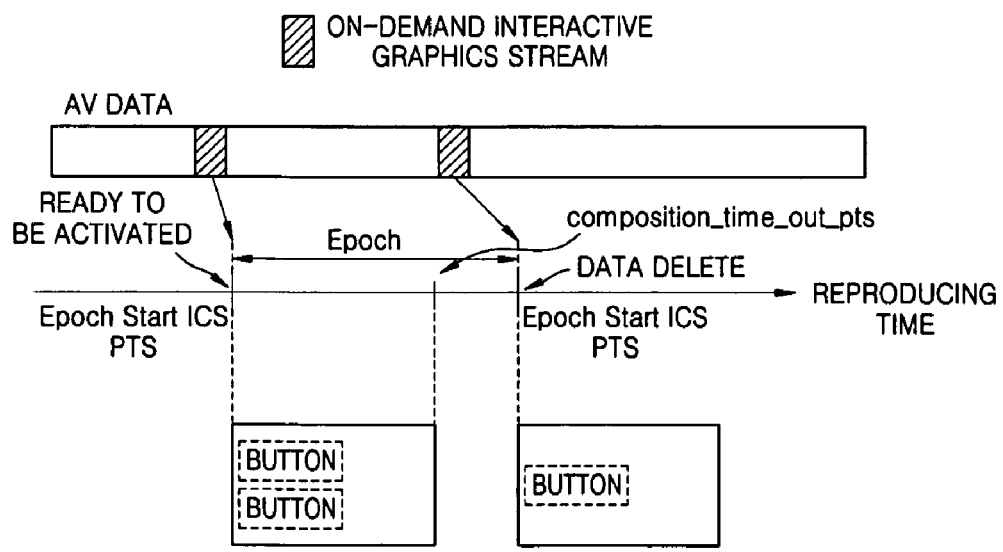

FIGS. 4, 5A and 5B are drawings illustrating an operational difference between a normal interactive graphics stream (FIG. 4) and an on-demand interactive graphics stream (FIGS. 5A and 5B) according to an embodiment of the present invention.

FIG. 4 illustrates an operation when a normal interactive graphics stream is reproduced. Referring to FIG. 4, normal interactive graphics streams are multiplexed in AV data. Each decoded normal interactive graphics stream is displayed on a screen according to a PTS included in an ICS of an ES display set. Here, a user can navigate or select buttons displayed on the screen. According to a user command, an operation assigned a button is performed.

For example, when navigating a button, a state of the button is changed from a selected state to an unselected state, an output image of the button is changed so as to be suitable for the unselected state, and when the user selects a specific button, an operation according to a navigation command assigned to the specific button is performed. Also, when the command assigned to the specific button is a command to move to another location of the AV data, even if an output finish time (composition_time_out_pts) of the normal interactive graphics stream has not been reached yet, the specific button disappears from the screen, and AV data indicated by the move command is displayed on the screen. On the other hand, when the command assigned to the specific button is not the command to move to another location of the AV data, the command defined to the specific button is performed, an output state of each button is maintained until the output finish time (composition_time_out_pts) is reached, and when the output finish time (composition_time_out_pts) is reached, the specific button disappears from the screen. That is, a normal interactive graphics stream is displayed on a screen at a designated time, and when a designated output finish time is reached, the normal interactive graphics stream disappears from the screen.

FIGS. 5A and 5B illustrate operations when an on-demand interactive graphics stream is reproduced according to an embodiment of the present invention.

Referring to FIG. 5A, on-demand interactive graphics streams are multiplexed in AV data. When an on-demand interactive graphics stream is decoded, the on-demand interactive graphics stream is ready to be activated. Even if the on-demand interactive graphics stream is ready to be activated, a relevant button is displayed on a screen only if a user's command is generated, in which case, a user command can be received. The relevant button displayed on the screen disappears from the screen when an output finish time (composition_time_out_pts) is reached. Also, all decoded data in a buffer of a decoder disappears when the output finish time is reached by setting an epoch to the output finish time. Therefore, a user's activation command received after the output finish time is ignored.

Referring to FIG. 5B, as with the normal interactive graphics stream shown in FIG. 4, an epoch can be defined to terminate before it reaches a subsequent ICS of an ES display set. In this case, since all relevant data in a buffer of a decoder is deleted when the subsequent ICS of the ES display set is reached, even if an output finish time (composition_time_out_pts) has been reached, the relevant data does not have to be deleted from the decoder. However, even if an activation command of a menu is generated by a user after the output finish time is reached, a selected button is not reproduced by recognizing that a valid interactive display duration has ended. That is, a user's activation command received after the output finish time is ignored.

As described above, an on-demand interactive graphics stream and a normal interactive graphics stream have a similar data structure. However, a difference between the two streams is that the displaying of a button on a screen is determined by a user's activation command in the on-demand interactive graphics stream and by a designated time in the normal interactive graphics stream. That is, if only information for discriminating two types of interactive graphics streams is added, the same data structure can be used for realizing the two types of interactive graphics streams.

Additional methods of discriminating the on-demand interactive graphics stream from the normal interactive graphics stream are as follows:

First method: a method of discriminating the two streams by using a segment_type field of an ICS Second method: a method of discriminating the two streams by adding an ICS_type field to the ICS Third method: a method of discriminating the two streams by defining an On_demand_ICS structure as a new structure of the on-demand interactive graphics stream.

FIGS. 6A through 6C illustrate a method (the first method) of discriminating an on-demand interactive graphics stream according to an embodiment of the present invention from a normal interactive graphics stream.

Referring to FIGS. 6A and 6B, a graphics_segment structure includes a segment_descriptor 602 which includes a segment_type field 604 indicating a segment type. In FIG. 6C, segment types, which the segment_type field 604 can indicate, are defined. In the first method, the segment_type field 604 can be defined such that a normal interactive graphics stream type (Normal_ICS) 606 has a value 0x18 and an on-demand interactive graphics stream type (On_demand- _ICS) 607 has a value 0x19. That is, the first method discriminates the two types of interactive graphics streams using the segment_type field 604 when the two types of interactive graphics streams have the same structure.

Figures 7, 8:
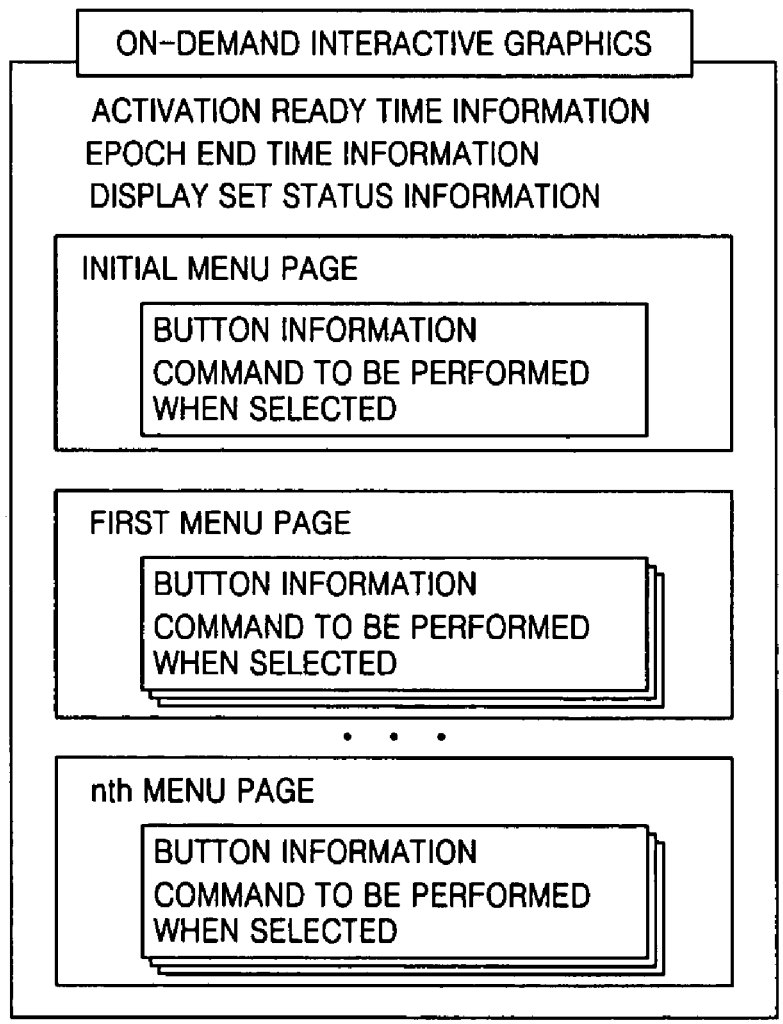
FIG. 7 illustrates a method of discriminating an on-demand interactive graphics stream according to another embodiment of the present invention from a normal interactive graphics stream.
FIG. 8 illustrates a method of discriminating an on-demand interactive graphics stream according to another embodiment of the present invention from a normal interactive graphics stream.

FIG. 7 illustrates a method (the second method) of discriminating an on-demand interactive graphics stream according to another embodiment of the present invention from a normal interactive graphics stream.

Referring to FIG. 7, on-demand and normal interactive graphics streams have the same structure (interactive_composition_segment), and in the second method, the two types of interactive graphics streams are discriminated using an ICS_type field 702. That is, the ICS_type field is defined so that, if a value of ICS_type is 0, ICS_type indicates a normal interactive graphics stream, and if a value of ICS_type is 1, ICS_type indicates an on-demand interactive graphics stream.

FIG. 8 illustrates a method (the third method) of discriminating an on-demand interactive graphics stream according to another embodiment of the present invention from a normal interactive graphics stream.

Referring to FIG. 8, a newly defined an On_demand_ICS structure is shown. Unlike the first and second methods in which the same structure is used, in the third method, a new structure of an on-demand interactive graphics stream is defined.

Unlike a structure of a normal interactive graphics stream, the On_demand_ICS structure, the new structure of the on-demand interactive graphics stream defines pages to be configured operation by operation such as an initial menu page including an initial button informing a user that the on-demand interactive graphics stream is decoded and is ready to be activated by the user and pages including buttons to be displayed after the on-demand interactive graphics stream is activated by the user, i.e., a first menu page through an nth menu page. Each menu page to be displayed can include reproduction information of at least one button to be displayed and command information indicating what operation will be performed if the button is selected.

On the basis of an on-demand interactive graphics stream according to embodiments of the present invention described above, a configuration of a reproducing apparatus supporting the on-demand interactive graphics stream according to an embodiment of the present invention will be described.

Figure 9:
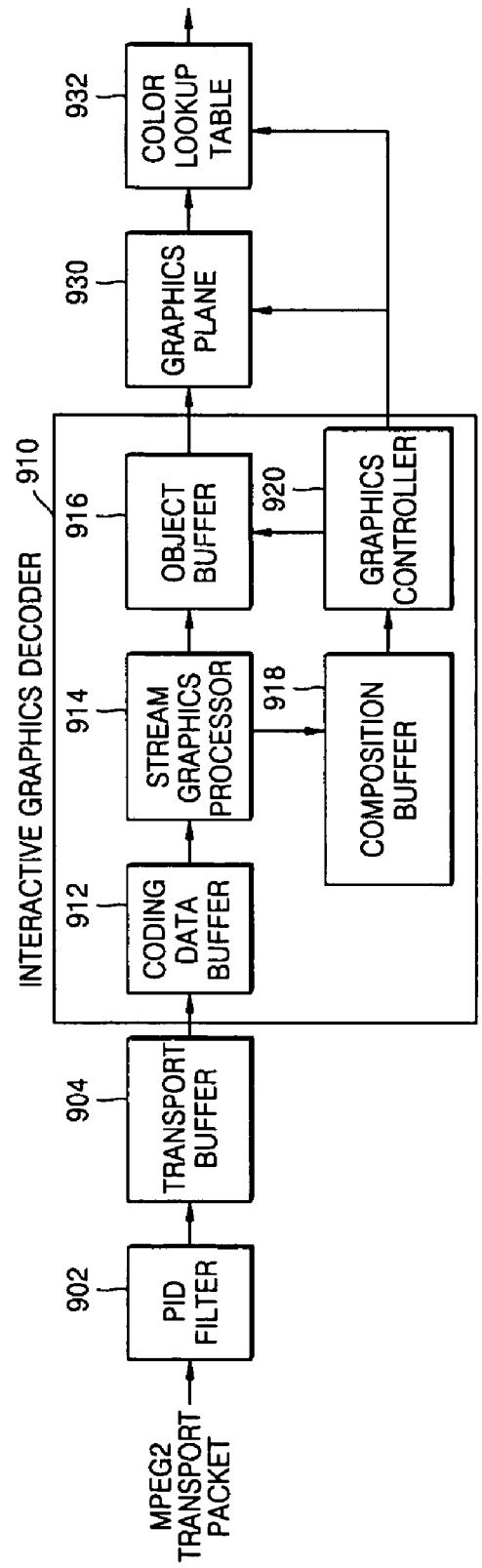
FIG. 9 is a block diagram of a reproducing apparatus for reproducing an on-demand interactive graphics stream according to an embodiment of the present invention.
Figure 10:
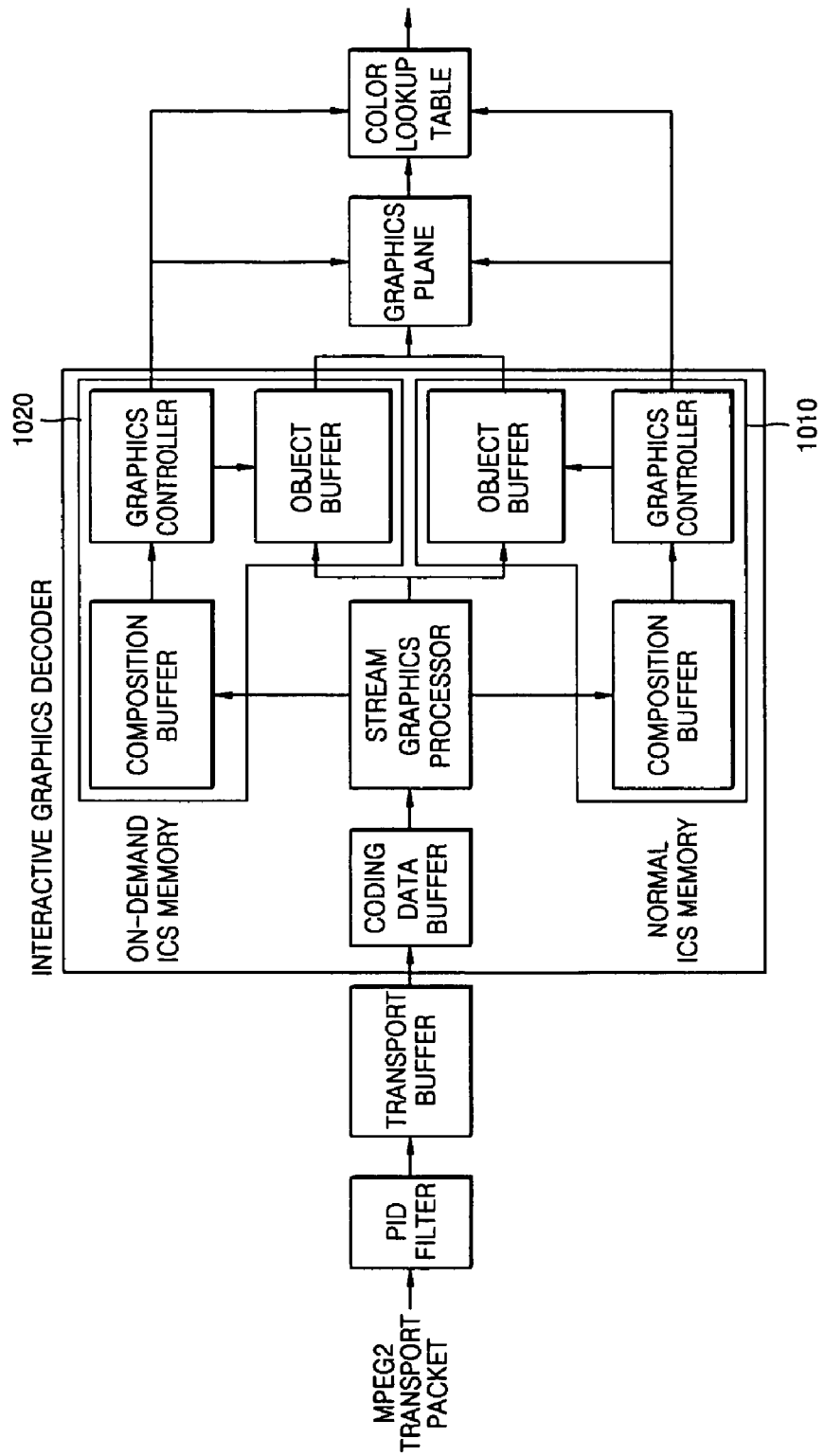
FIG. 10 is a block diagram of a reproducing apparatus for reproducing an on-demand interactive graphics stream according to another embodiment of the present invention.

FIGS. 9 and 10 are block diagrams of reproducing apparatuses for reproducing an on-demand interactive graphics stream according to embodiments of the present invention.

Referring to FIG. 9, an interactive graphics decoder 910 of a reproducing apparatus according to an embodiment of the present invention is shown. AV data read from a storage medium is input to a packet identifier (PID) filter 902, and only an interactive graphics stream is selectively transmitted to a transport buffer 904 and decoded by the interactive graphics decoder 910.

In the interactive graphics decoder 910, the interactive graphics stream is temporarily stored in a coding data buffer 912 and then transmitted to a stream graphics processor 914. After the interactive graphics stream is decoded by the stream graphics processor 914, button image object data is transmitted to an object buffer 916, and button configuration information is transmitted to a composition buffer 918. A graphics controller 920 builds output images for received object data with reference to relevant configuration information and transmits the built image to a graphics plane 930. That is, at the time identified by a PTS, an output start time of an interactive graphics stream, the graphics controller 920 determines an image to be displayed on a screen and transmits the determined image from the object buffer 916 to the graphics plane 930. The transmitted image is output with reference to a color lookup table (CLUT) 932 according to color information included in the relevant configuration information. Also, the graphics controller 920 may change a button state according to a move or selection of a button in response to a user command and adapt this result to a screen output.

Particularly, FIG. 9 shows a block diagram of a reproducing apparatus configured such that a normal interactive graphics stream and an on-demand interactive graphics stream use the same buffer memory. Since the two types of interactive graphics streams use the same buffer of the decoder 910 as shown in FIG. 9, only one of the normal interactive graphics stream and the on-demand interactive graphics stream can exist in the buffer of the decoder 910 at a given time. That is, only one type of interactive graphics stream can be processed at once.

FIG. 10 is a block diagram of a reproducing apparatus for reproducing an on-demand interactive graphics stream according to another embodiment of the present invention.

Referring to FIG. 10, a reproducing apparatus configured such that a normal interactive graphics stream and an on-demand interactive graphics stream are stored in separate buffer memories is shown. That is, the normal interactive graphics stream is stored in a normal ICS memory area 1010, and the on-demand interactive graphics stream is stored in an on-demand ICS memory area 1020. Therefore, the two types of interactive graphics streams can simultaneously exist in buffers. In this case, when a normal interactive graphics stream is input in a state where an on-demand interactive graphics stream exists in a buffer, or when an on-demand interactive graphics stream is input in a state where a normal interactive graphics stream exists in a buffer, the buffer memory of a decoder does not have to be reset. However, when the two types of interactive graphics streams are simultaneously displayed on a screen, it may not be clear which object a user operation is related to, and adapting color information to a screen configuration can be problematic. Therefore, even though not shown in FIG. 10, the reproducing apparatus can further include a control unit selecting the normal interactive graphics stream or the on-demand interactive graphics stream to be output and the respective CULT block for the interactive graphics stream.

Figure 11:
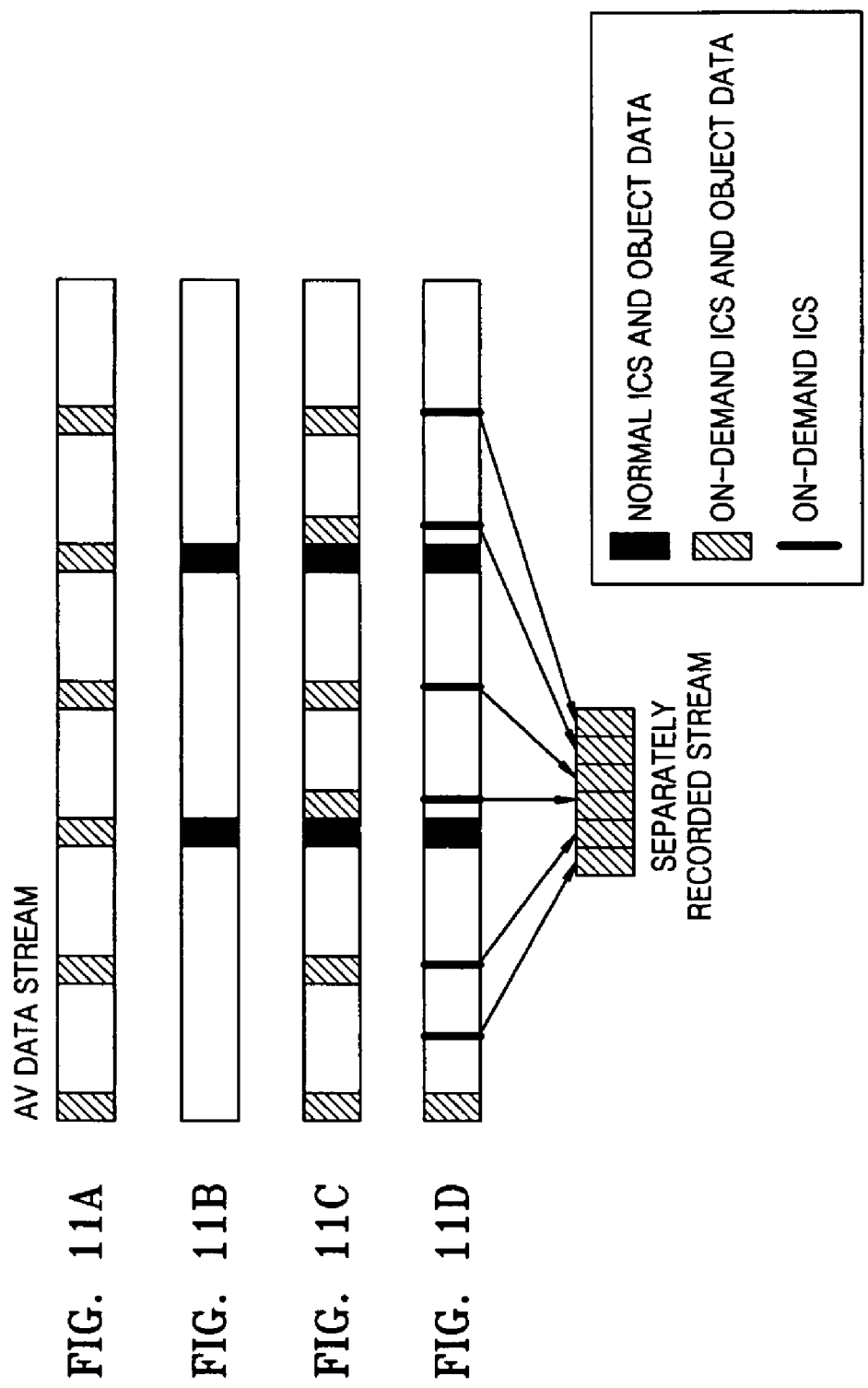
FIGS. 11A-11D illustrate an interactive graphics streams included in AV data according to an embodiment of the present invention.

FIG. 11 illustrates an interactive graphics stream included in AV data according to an embodiment of the present invention.

Referring to FIG. 11, FIG. 11A shows a case where only on-demand interactive graphics streams are recorded in single AV data. FIG. 11B shows a case where only normal interactive graphics streams are recorded in single AV data. FIG. 11C shows a case where two types of interactive graphics streams are mixed and recorded in single AV data. FIG. 11D shows a case where two types of interactive graphics streams are mixed and recorded in single AV data and on-demand interactive graphics streams are separated from the other AV data and recorded. In particular, referring to FIG. 11D, when the AV data is read from the beginning, on-demand ICS data recorded at the beginning of the AV data is referred to. However, when the AV data is read from a middle position, since only configuration information is recorded in the AV data while object data of a real button image is separately recorded, the button is output using the separately recorded object data with reference to the configuration information recorded in the AV data. In this case, unnecessary data redundancy can be prevented by separately recording the object data.

On the basis of the data configurations of an on-demand interactive graphics stream and the configurations of a reproducing apparatus described above, a process of outputting the on-demand interactive graphics stream to a screen according to a user's activation command will be described.

Figure 12:
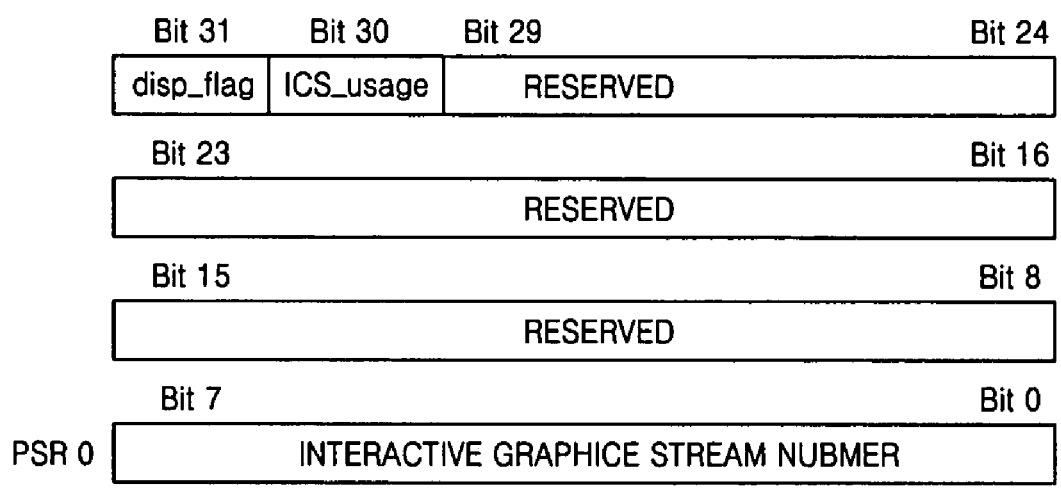
FIG. 12 illustrates a configuration of a player status register recording information regarding an interactive graphics stream according to an embodiment of the present invention.

FIGS. 12 and 13 illustrate configurations of player status registers for recording information regarding an interactive graphics stream according to embodiments of the present invention.

Referring to FIG. 12, in a player status register (PSR), a number of an interactive graphics stream being currently reproduced or an interactive graphics stream to be reproduced later is recorded. In FIG. 12, the number is recorded in bit0-bit7 of a PSR 0. Therefore, even when reproduction of a multimedia image is temporarily stopped and restarted, an interactive graphics stream that was being reproduced just before can be reproduced again by referring to the PSR 0.

In a reproducing apparatus supporting both normal interactive graphics stream and on-demand interactive graphics stream, it must be determined whether a stream number recorded in the PSR 0 is a number indicating the normal interactive graphics stream or the on-demand interactive graphics stream. Therefore, a reproducing apparatus according to an embodiment of the present invention includes an ICS_usage flag for determining whether an interactive graphics stream number recorded in the PSR 0 is a number indicating the normal interactive graphics stream or the on-demand interactive graphics stream. In FIG. 12, the ICS_usage flag is recorded in bit30 of the PSR 0. That is, if a stream being currently reproduced is an on-demand interactive graphics stream, the ICS_usage flag is set to 1, and if the stream being currently reproduced is a normal interactive graphics stream, the ICS_usage flag is set to 0.

Also, in an on-demand interactive graphics stream, a disp_flag flag is defined to indicate whether the stream is to be displayed on a screen. In FIG. 12, the disp_flag flag is recorded in bit31 of the PSR 0. If the disp_flag flag is set to 1, when an on-demand interactive graphics stream is ready to be activated, the reproducing apparatus displays an initial menu page on the screen to inform a user that the on-demand interactive graphics stream is ready to be activated. If the disp_flag flag is set to 0, the reproducing apparatus does not display an interactive graphics on the screen.

On the other hand, when the disp_flag flag is set to 0 and an on-demand interactive graphics stream is ready to be activated, that is, when the on-demand interactive graphics stream is ready to be activated and the on-demand interactive graphics stream is not to be displayed on the screen, there are two methods of processing the on-demand interactive graphics stream. In the first method, the reproducing apparatus is configured such that the on-demand interactive graphics stream is activated when an activation command is generated by a user. In the second method, the reproducing apparatus is configured such that the on-demand interactive graphics stream is not activated and the user's command is ignored when generated by the user.

FIG. 13 illustrates a configuration of a player status register recording information regarding an interactive graphics stream according to another embodiment of the present invention. Referring to FIG. 13, a reproducing apparatus configured to record two types of interactive graphics streams in separate PSRs is shown. That is, a case where information regarding a normal interactive graphics stream is recorded in a PSR 0 and information regarding an on-demand interactive graphics stream is recorded in a PSR 11 is shown.

If an ICS_type field indicates a normal interactive graphics stream, information regarding the normal interactive graphics stream is recorded in the PSR 0, and if the ICS_type field indicates an on-demand interactive graphics stream, information regarding the on-demand interactive graphics stream is separately recorded in the PSR 11. Accordingly, unlike the configuration shown in FIG. 12, an ICS_usage flag for determining an ICS type of an interactive graphics stream is not required. However, in the PSR 11, it is required that a disp_flag flag indicating whether an initial menu page for informing a user that an on-demand interactive graphics stream is ready to be activated is displayed on a screen, and the operation of the disp_flag flag is the same as FIG. 12. In FIG. 13, the disp_flag flag is recorded in bit31 of the PSR 11.

FIG. 14 illustrates a process of handling a command for activating an on-demand interactive graphics stream generated by a user.

Referring to FIG. 14, when an activation command is generated by a user, a reproducing apparatus determines whether an on-demand interactive graphics stream is ready to be activated in an interactive graphics decoder, and if the on-demand interactive graphics stream is ready to be activated, the on-demand interactive graphics stream is displayed on a screen, a focus is set to receive a user command, and a button selection from the user is ready to be received. If the on-demand interactive graphics stream is not ready to be activated, an activation command from the user is ignored, or a message informing the user that an on-demand interactive graphics stream to be output does not exist is displayed on the screen.

Figure 15A:
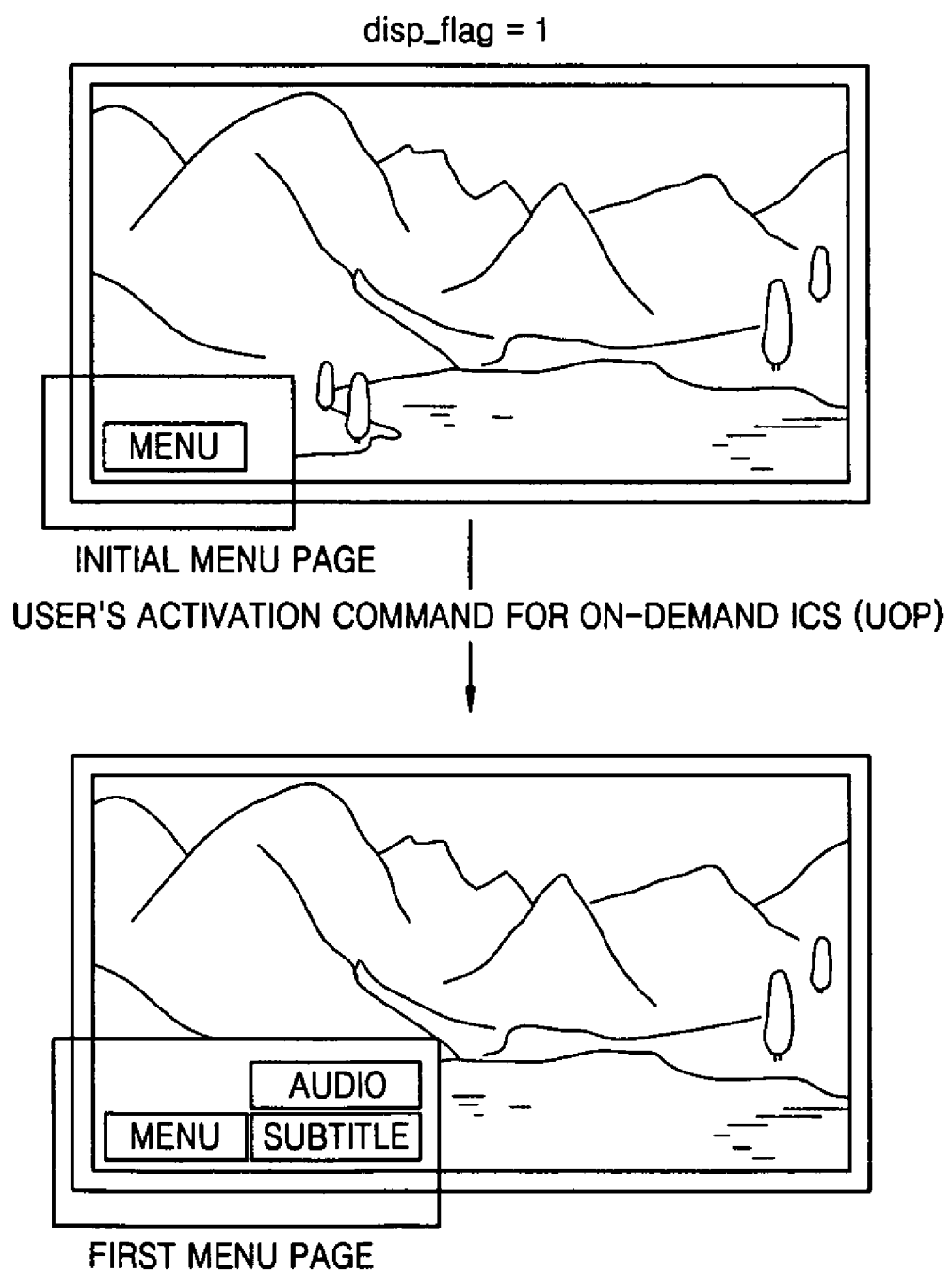
FIGS. 15A and 15B show display statuses according to values of a disp_flag flag for the configurations of player status registers shown in FIGS. 12 and 13, respectively.
Figure 15B:
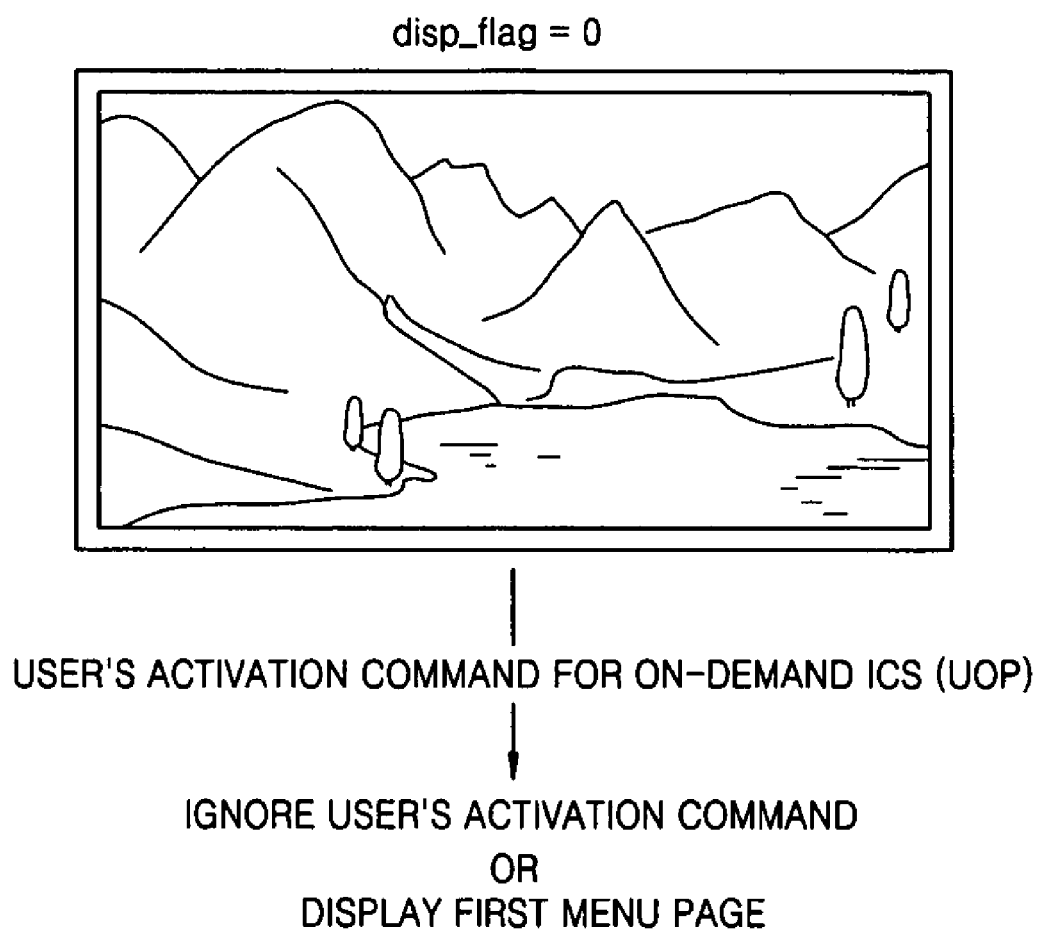

FIGS. 15A and 15B show display statuses according to values of a disp_flag flag for the configurations of player status registers shown in FIGS. 12 and 13, respectively.

Referring to FIG. 15A, when a disp_flag flag is set to 1, if an on-demand interactive graphics stream is decoded and ready to be activated, an initial menu page is displayed on a screen informing a user that the on-demand interactive graphics stream is ready to be activated. If an activation command for the on-demand interactive graphics stream is generated by the user, a first menu page is displayed on the screen.

Referring to FIG. 15B, when the disp_flag flag is set to 0, the initial menu page is not displayed on the screen even if the on-demand interactive graphics stream is decoded and ready to be activated. However, when an activation command for the on-demand interactive graphics stream is generated by the user, a reproducing apparatus can be configured so that the activation command is ignored or the first menu page is displayed on the screen.

Figure 16:
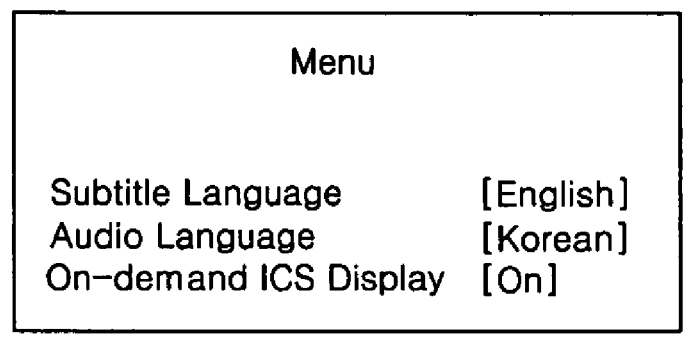
FIG. 16 illustrates a system menu of a reproducing apparatus in which menu items for turning an output of an on-demand interactive graphics stream on/off are defined.

FIG. 16 illustrates a system menu of a reproducing apparatus in which menu items for turning an output of an on-demand interactive graphics stream on/off are defined. If a user sets an On-demand ICS Display item on, a disp_flag flag of a status register storing information regarding the on-demand interactive graphics stream, for example, the PSR 0 or the PSR 11 described above, is set to 1. On the other hand, if the user sets the On-demand ICS Display item off, the reproducing apparatus sets the disp_flag flag of the status register as 0. That is, the disp_flag flag can be changed using a user interface, which is called the system menu.

Figure 17:
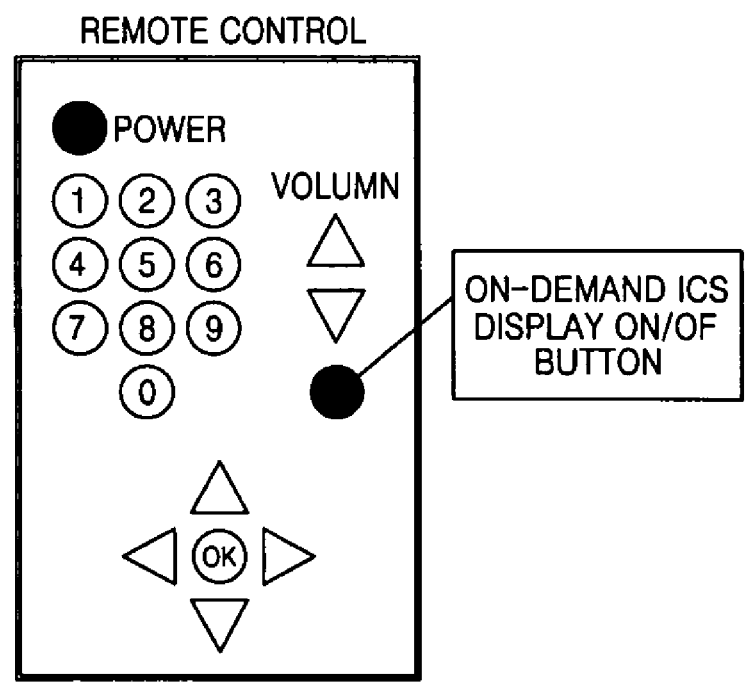
FIG. 17 is a schematic diagram of a remote control including a button for turning an output of an on-demand interactive graphics stream on/off.

FIG. 17 is a schematic diagram of a remote control including a button for turning an output of an on-demand interactive graphics stream on/off. A user can set a disp_flag flag of a status register to 0 or 1 by pushing a relevant button.

On the basis of the data configurations of an on-demand interactive graphics stream and the configurations of a reproducing apparatus described above, a reproducing method according to an embodiment of the present invention will now be described.

Figure 18:
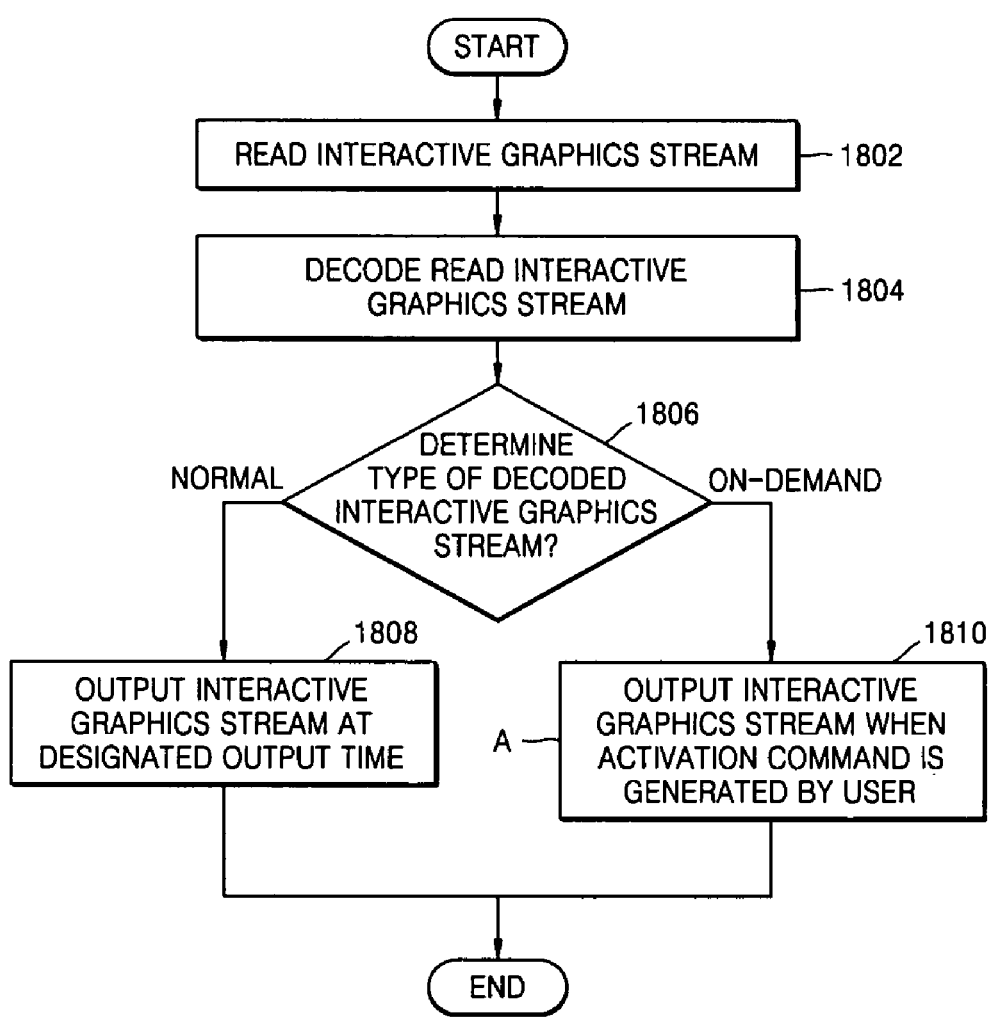
FIG. 18 is a flowchart illustrating a method of reproducing a storage medium on which an interactive graphics stream is recorded according to an embodiment of the present invention.
Figure 19:
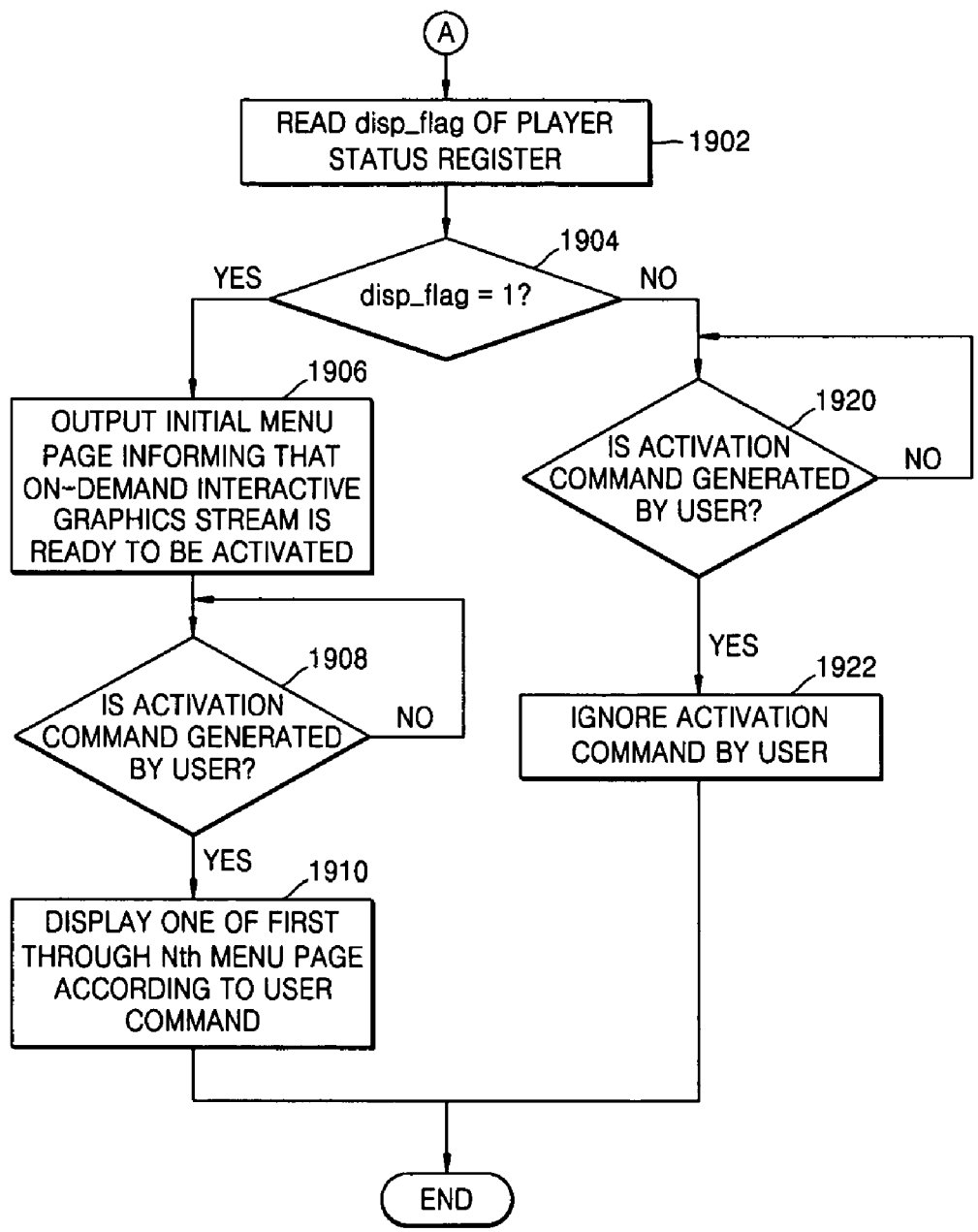
FIG. 19 is a detailed flowchart illustrating the method of reproducing a storage medium on which an on-demand interactive graphics stream illustrated in FIG. 18 is recorded.

FIGS. 18 and 19 are flowcharts illustrating a method of reproducing a storage medium on which an interactive graphics stream is recorded according to an embodiment of the present invention.

Referring to FIG. 18, an interactive graphics stream is read from a storage medium storing normal interactive graphics streams, and/or on-demand interactive graphics streams, in operation 1802. The read interactive graphics stream is checked in operation 1804. The type of the decoded interactive graphics stream is checked in operation 1806. If the decoded interactive graphics stream is a normal interactive graphics stream, the decoded interactive graphics stream is blended with video data and displayed on a screen at a designated time in operation 1808. If the decoded interactive graphics stream is an on-demand interactive graphics stream, the decoded interactive graphics stream is blended with the video data and displayed on the screen only if an activation command is generated by a user in operation 1810.

FIG. 19 is a detailed flowchart illustrating the process of reproducing the on-demand interactive graphics stream illustrated in FIG. 18.

Referring to FIG. 19, if the decoded interactive graphics stream is an on-demand interactive graphics stream, a disp_flag flag indicating whether the on-demand interactive graphics stream is to be displayed on the screen is read from a player status register in operation 1902. If a value of the disp_flag flag is 1 in operation 1904, an initial menu page informing the user that the on-demand interactive graphics stream is ready to be activated is displayed on the screen in operation 1906. If the user inputs an activation command when the output initial menu page is displayed in operation 1908, a menu page demanding on the user command is displayed on the screen in operation 1910.

On the other hand, if the value of the disp_flag flag is 0 in operation 1904, nothing is displayed on the screen, and even if an activation command is generated by the user in operation 1920, the activation command is ignored in operation 1922. Even though it is not shown in FIG. 19, if the value of the disp_flag flag is 0, nothing is displayed on the screen, and if an activation command is generated by the user using a user interface such as a remote control, the initial menu page is displayed on the screen.

By using an on-demand interactive graphics stream according to described embodiments of the present invention, the on-demand interactive graphics stream can be controlled so that it is displayed on and disappears from a screen at designated times or displayed on the screen only if a user generates a command.

According to the described embodiments of the present invention, an interactive graphics such as a button can be controlled by using an on-demand interactive graphics stream so that the button is displayed on a screen when a user generates a command.

Also, an interactive graphics stream specialized for a relevant area can be configured by configuring different on-demand interactive graphics streams for certain areas or chapters of AV data. For example, instead of buttons performing fixed functions, information related to actors/actresses, properties, and shooting locations existing in certain areas included in multimedia images can be provided to a user.

Furthermore, the number of buttons on a remote control can be reduced by configuring functions corresponding to the buttons of the remote control with a menu driven method using an on-demand interactive graphics stream.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A reproducing method of reproducing from a storage medium video data and graphics data for displaying a menu screen, comprising:
   decoding graphics data;
   outputting the decoded graphics data when an activation command is generated by a user and the decoded graphics data is first graphics data; and
   outputting the decoded graphics data at a designated time when the decoded graphics data is second graphics data,
   wherein the first graphics data and the second graphics data have an interactive composition segment structure which includes a type field, and
   the type field is defined so that, when a value of the type field is a first value, the second graphics data is indicated, and when a value of the type field is a second value, the first graphics data is indicated, the first value for the type field corresponding to a normal interactive graphics stream and the second value for the type field corresponding to an on-demand interactive graphics stream.

2. The reproducing method of claim 1, wherein the type field comprises a binary data field.

* * * * *